(12) United States Patent
Roy et al.

(10) Patent No.: US 6,956,569 B1
(45) Date of Patent: Oct. 18, 2005

(54) METHOD FOR MATCHING A TWO DIMENSIONAL IMAGE TO ONE OF A PLURALITY OF THREE DIMENSIONAL CANDIDATE MODELS CONTAINED IN A DATABASE

(75) Inventors: Sebastien Roy, Montreal (CA); Albert Peter Blicher, East Windsor, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/538,209

(22) Filed: Mar. 30, 2000

(51) Int. Cl.$^7$ .............................................. G06T 17/00
(52) U.S. Cl. ..................................... 345/426; 345/418
(58) Field of Search ................................ 345/418, 419, 345/423, 424, 426, 427, 589, 591

(56) References Cited

U.S. PATENT DOCUMENTS

| | | | | | |
|---|---|---|---|---|---|
| 4,970,666 | A | * | 11/1990 | Welsh et al. ................. | 364/522 |
| 5,173,947 | A | * | 12/1992 | Chande et al. ................. | 382/47 |
| 5,990,900 | A | * | 11/1999 | Seago ........................ | 345/427 |
| 6,097,840 | A | * | 8/2000 | Shiitani et al. ............. | 382/203 |
| 6,243,093 | B1 | * | 6/2001 | Czerwinski et al. ........ | 345/355 |
| 6,373,979 | B1 | * | 4/2002 | Wang ........................ | 345/589 |

OTHER PUBLICATIONS

T. Riklin–Raviv; A. Shahsua: "The Quotient Image: Class Based Re–rendering and Recognition With Varying Illuminations" Technical Reports of the Leibniz Center, 'Online! (Jan. 1999), XP002220057, retrieved from the Internet: URL: http://leibniz.cs.huji.ac.il/research/abstract.php?abstract=261 'retrieved on Nov. 8, 2002! *abstract* & T. Riklin–Raviv; A. Shahsua: "The Quotient Image: Class Based Re–rendering and Recognition With Varying Illuminations" IEEE Transactions On Pattern Analysis and Machine Intelligence, vol. 23, No. 2, (Feb. 2001), pp. 129–139, X001005759 IEEE Inc. New York, US ISSN: 0162–8828.

P.N. Belhumeur et al., "What Is the Set of Images of an Object under All Possible Illuminatio Conditions?", International Journal of Computer Vision, 1998, pp. 1–16.

P.N. Belhumeur et al., "The Bas–Relief Ambiguity", In the Proceedings of CVPR97.

(Continued)

*Primary Examiner*—Cliff N. Vo
(74) *Attorney, Agent, or Firm*—Scully, Scott, Murphy & Presser

(57) ABSTRACT

A method for matching a two dimensional image to one of a plurality of three dimensional candidate models. The method including the steps of: determining the position and orientation of the two dimensional image; for each three dimensional model, computing a histogram-like table having a computed brightness coefficient for each surface normal of the model based on the corresponding value in the two dimensional image, each brightness coefficient depending only on the corresponding surface normal; and either successively rendering each three dimensional model in the determined position and orientation using the surface normals in conjunction with the corresponding computed brightness histogram-like table; and comparing the two dimensional image with each of the rendered three dimensional models or computing the variance of the brightness coefficients that are used to create each bucket of the histogram-like table, a bucket being a set of similar normal values that are lumped together to form a single argument value in the histogram-like table; computing the sum of the variances of the histogram-like table buckets; and ranking the three dimensional models using its computed sum as an error function, the ranking indicating the likelihood that the corresponding three dimensional model matches the two dimensional image. Also provided is a program storage device readable by machine, tangibly embodying a program of instructions executable by the machine to perform the method steps of the present invention and a computer program product embodied in a computer-readable medium for carrying out the methods of the present invention.

24 Claims, 3 Drawing Sheets

OTHER PUBLICATIONS

P.N. Belhumuer et al., "Comparing Images Under Variable Illumination", To appear in the Proceedings of CVPR98.

R.A. Brooks, "Symbolic Reasoning Among 3–D Models and 2–D Images", Artificial Intelligence 17, 1981, pp. 285–345.

R.A. Brooks, "Model–Based Three–Dimensional Interpretations of Two–Dimensional Images", IEEE Transactions on Pattern Analysis and Machine Intelligence, 1983, pp. 140–150.

R.A. Brooks, et al., "The Agronym Model–Based Vision System", Proceeding of the Sixth International Joint Conference on Artificial Intelligence, 1979, pp. 105–113.

P. Dupuis et al., "Direct Method For Reconstructing Shape From Shading", IEEE 1992, pp. 453–458.

P. Dupuis et al., "Direct Method for Reconstructing Shape From Shading", DARPA Image Understand, 1992, pp. 563–571.

J. Oliensis et al., "Direct method for reconstructing shape from shading", SPIE, 1991, pp. 116–128.

A.S. Georghiades et al., "Illumination Cones for Recognition Under Variable Lighting: Faces", To appear in the Proceedings of CVPR98.

W.E.L. Grimson et al., "On the Verificatin of Hypothesized Matches in Model–Based Recognition", IEEE Transactions on Pattern Analysis and Machine Intelligence, 1991, pp. 1201–1213.

B.K.P. Horn, "Understanding Image Intensities", Artificial Intelligence 8, 1977, pp. 201–231.

B.K.P. Horn et al., "Calculating the reflectance map", Applied Optics, 1979, pp. 1770–1779.

B.K.P. Horn, "Hill–Shading and the Reflectance Map", Proceedings of the IEEE, vol. 69, 1981, pp. 14–47.

B.K.P. Horn, "Hill–Shading and the Reflcetance Map", Artificial Intelligence Laboratory, pp. 79–120.

D.P. Huttenlocher et al., "Object Recognition Using Alignment", DARPA Image Understanding Workshop, 1987, pp. 370–379.

D.P. Huttenlocher et al., "Object Recognition Using Alignment", IEEE, 1987, pp. 102–111.

D.P. Huttenlocher et al., "Recognizing Solid Objects by Alignment with an Image", International Journal of Computer Vision, 1990, pp. 195–212.

D.P. Huttenlocher et al., "Recognizing Solid Objects by Alignment", DARPA Image Understanding Workshop, 1998, pp. 1114–1122.

M. Kirby et al., "Application of the Karhunen–Loeve Procedure for the Characterization of Human Faces", IEEE, 1990, pp. 103–108.

J.J. Koenderink et al., "Photometric invariants related to solid shape", Optica Acta, 1980, pp. 981–996.

D.G. Lowe, "Fitting Parameterized Three–Dimensional Models to Images", IEEE Transactions on Pattern Analysis and Machine Intelligence, 1991, pp. 441–450.

D.G. Lowe, "Visual Recognition From Spatial Correspondence And Perceptual Organization", pp. 953–959.

D.G. Lowe, "Three–Dimensional Object Recognition from Single Two–Dimensional Images", 1987, pp. 355–395.

J. Olienis et al., "A Global Algorithm for Shape from Shading", IEEE, 1993, pp. 692–701.

J. Olienis et al., "Provably Convergent Algorithms for Shape from Shading", Image Understanding Workshop, 1993, pp. 1121–1130.

J. Olienis, "Shape from Shading as a Partially Well–Constrained Problem", CVGIP 1991, pp. 163–183.

J. Olienis, "Shape from Shading as a Partially Well–Constrained Proble", IEEE, 1991, pp. 559–564.

J. Olienis, "New Results In Shape From Shading", Image Understanding Workshop, 1990, pp. 145–153.

J. Olienis, "Uniqueness in Shape from Shading", International Journal of Computer Vision, 1991, pp. 74–105.

J. Olienis, "Existence and Uniqueness in Shape from Shading", IEEE, 1990, pp. 341–345.

P.S. Penev, "Local Feature Analysis: A general statistical theory for object representation", 1996, pp. 1–27.

L.G. Roberts, "Machine Perception of Three–Dimensional Solids", Massachusetts Institute of Technology Lincoln Laboratory, Technical Report No. 315, 1965, pp. 1–40.

A. Shashua, "Geometry and Photometry in 3D Visual Recognition", Massachusetts Institute of Technology, 1992, pp. 1–165.

L. Sirovich et al., "Low–dimensional procedure for the characterization of human faces", Optical Society of America, 1987, pp. 519–524.

M.A. Turk et al., "Face Recognition Using Eigenfaces", IEEE, 1991, pp. 586–591.

S. Ullman et al., "Recognition by Linear Combinations of Models", IEEE, 1991, pp. 992–1006.

T. Vetter, "Synthesis of novel flows from a single face image", Max–Planck–Institute Technical Report No. 26, 1996, pp. 1–13.

T. Vetter et al., "Estimating Coloured 3D Face Methods from Single Images: An Example Based Approach", European Conference on Computer Vision vol. 2, pp. 499–512.

P. Viola et al., "Alignment by Maximization of Mutual Information", To appear at the International Conference on Computer Vision, 1995.

L. Wiskott et al., "Face Recognition by Elastic Bunch Graph Matching", IEEE Transactions on Pattern Analysis and Machine Intelligence, vol. 19, 1997, pp. 775–779.

P.H. Winston, "Obtaining Shape From Shading Information", The Psychology of Computer Vision, pp. 115–155.

B.K.P. Horn et al., "Calculating The Reflectance Map", Artificial Intelligence Laboratory, pp. 115–126.

M. Turk et al., Eigenfaces for Recognition:, Journal of Cognitive Neurosociece, vol. 3, No. 1, 1991, pp. 71–86.

C.F. Olsen, "Fast Object Recognition by Selectively Examining Hypotheses", Dissertation submitted to University of California, 1994, pp. 1–136.

S. Ullman, "High–level Vision Object Recognition and Visual Cognition", Approaches to Object Recognition, pp. 31–213.

T. Alter et al., "Uncertainty Propagation in Model–Based Recognition", International Journal of Computer Vision, 1998, pp. 127–159.

Y. Hel–Or et al., "Pose Estimation by Fusing Noisy Data of Different Dimensions", IEEE, 1995, pp. 195–201.

R.M. Haralick et al., "Analysis and Solutions of The Three Point Perspective Pose Estimation Problem", IEEE 1991, pp. 592–598.

R. Horaud, "New Methods for Matching 3–D Objects with Single Perspective Views", IEEE, 1987, pp. 401–412.

D.P. Huttenlocher, "Three–Dimensional Recognition of Solid Objects from a Two–Dimensional Image", MIT Artificial Laboratory, Technical Report 1045, 1988, pp. 1–161.

D.P. Huttenlocher et al., "Object Recognition Using Alignment", IEEE, 1987, pp. 102–111.

R. Zurmuhl, "Praktische Mathematik", Springer–Verlag, 1965, pp. 60–65.

M.A. Fischler et al., "Random Sample Consensus: A Paradign for Model Fitting with Application to Image Analysis and Automated Cartography", SRI International 1981, pp. 381–395.

D.P. Huttenlocher et al., "Recognizing Solid Objects by Alignment with an Image", International Journal of Computer Vision, 1990, pp. 195–212.

A.R. Brooks, "Symbolic Reasoning Among 3–D Models and 2–D Images", Dissertation 1981, pp. 1–172.

B.K.P. Horn, "Shape From Shading: A Method for Obtaining the Shape of a Smooth Opaque Object from one View", Massachusetts Institute of Technology, 1970, pp. 1–197.

* cited by examiner

METHOD FOR MATCHING A TWO DIMENSIONAL IMAGE TO ONE OF A PLURALITY OF THREE DIMENSIONAL CANDIDATE MODELS CONTAINED IN A DATABASE

BACKGROUND OF THE INVENTION

1. Field of the Invention

This invention relates generally to computer vision and more particularly to the recognition and identification of a face or other object from among a stored database of three dimensional (3D) models when presented with an arbitrary two dimensional (2D) photograph of a face or object, under arbitrary pose and lighting conditions.

b 2. Prior Art

There are two subfields of computer vision that are closely related to the field of this invention: face recognition, and object recognition. Face recognition has primarily been concerned with identifying 2D images of human faces, or matching 2D images of faces to other such 2D images. The methods of the prior art have not used 3D models of faces to identify 2D images.

The field of object recognition, however, has had a major concern with identifying 2D images based on known 3D models. There have been numerous works in this area. A more recent example is the methods that use what is called "alignment".

The usual methods consist of extracting some features from the gray scale image which are then matched with candidate features from the models. Examples of features are special points (such as corners), extracted edges, configurations of edges (such as parallel edges, sometimes referred to as "ribbons"), etc. The primary problems in the object recognition literature revolve around how to (1) choose good features, (2) how to manage the combinatorial explosion that results from the possibilities of matching large numbers of image features with large numbers of model features, and (3) how to measure the quality of a match in the presence of numerous sources of error. The issue of lighting enters primarily at the (early) stage when features for matching are being extracted. The prior art related to object recognition has considerable bearing on performing step (1) above (pose estimation), but has little to say about the problem of accounting for the effects of light that are needed in steps (2) and (3).

Face recognition, on the other hand, has had considerable interest in dealing with lighting. The face recognition literature has evolved a number of methods of dealing with variations in lighting. These revolve around two main approaches: (1) estimating the lighting conditions (as in step (2) above), or (2) analyzing the space of images that is created as the lighting is varied. Typically, method (2) takes advantage of "principal components analysis" (PCA) to identify the dimensions of the image space where the most variation occurs. These typically image-based methods have been fairly successful under conditions where pose does not vary. However, in general they have not been concerned with the use of 3D models, although there are those in the art who have constructed 3D models from images, and have been concerned about the relations between images and 3D structure, as have a large fraction of workers in computer vision.

There is also significant work by others in the art on using the space of distortions of a face in conjunction with the observed shading to permit a linearization that in turn admits a PCA analysis on which recognition can be based. These artisans use a method based on distortions of graphs that join standard feature points on the face or similar methods, which have been applied in commercially available systems. Many groups in recent years have been interested in face recognition and the literature that has arisen in the past 5 or so years is quite large. The primary focus of all these methods, however, has been on identifying 2D images based on training sets of other 2D images.

A major contributing factor to the explosion in interest in face recognition was the successful application of PCA methods to the problem. This was impressive because it was a tractable solution to what had hitherto been considered an intractable problem. However, there are severe limitations with respect to variation of the conditions under which the data must be captured; in particular, lighting, pose, and scale must be as constant as possible. These limitations can be traced to the fact that PCA is a linear decomposition and therefore only will give good results when the space it is being applied to is a linear space. The space of images under varying pose is not linear, and therefore PCA breaks down. Those in the art have addressed this problem by finding particular ways to convert the nonlinear space back to a linear one that is amenable to PCA. Still others in the art have pointed out that in the simplest cases, any image of such a simple object was just a linear combination of the images under almost any 3 different lighting conditions. This led to activity in this area, culminating with work on rigorously working out the relationship between lighting and the space of images. It should be pointed out, however, that in the presence of shadows, the situation is still quite complex.

There are apparatus known in the art for capturing 3D models of people's faces. These apparatus capture pictures of the faces in registration with the 3D models that are captured. The 3D models consist of the 3-dimensional coordinates of a large number of points on the surface of the face, typically on the order of 640×640, along with the color picture value at each point. This provides the possibility of realistic computer graphics rendering of the faces from any vantage point.

It is envisioned that these apparatus can be used to capture a large number of face models. In some applications, this number could reach on the order of one million faces or more.

One application of such apparatus is face identification, i.e., given a query consisting of an arbitrary 2D photograph of a face, to search a large database of previously captured 3D models of faces to find the model which best matches the photograph.

There are numerous obstacles to be overcome to accomplish this. In general, there is no knowledge or control of the conditions under which the query photograph was acquired. Therefore, the pose (i.e. the position and orientation of the subject) and the lighting conditions of the query photograph are unknown.

One prior art paradigm, in this setting, for matching a query to a model, proceeds as follows:

1) the pose of the face in the query is determined. For purposes of this application, "pose" is defined as the 3D position and orientation of the face;
2) the lighting in the query is determined. This means finding the direction, intensity, and color of any number of light sources which may have been illuminating the subject when the query photograph was acquired;

3) for each model in the database, computer graphics techniques are then used to render a realistic image of the model in the pose and lighting conditions determined in steps (1) and (2); and 4) among the renderings computed in the previous step, the one which most closely approximates the query is found.

All of these steps involve difficulties which the current state of the art has not overcome. The methods of the present invention concerns the second, third and fourth steps, namely, finding the lighting conditions in the query, and determining which proposed candidate would appear most like the query under those lighting conditions.

The impediment in the method of the prior art described above is that to solve for lighting requires knowing the 3-dimensional configuration of the surface that was photographed, as well as its reflectance characteristics. However, the query does not provide any of this information directly. A large effort in computer vision over the past 40 years has been devoted to inferring this information from one or more pictures.

The methods of the prior art perform steps (2) and (3) above by first solving for lighting by solving the image irradiance equation (the Lambertian imaging equation), which is a system of linear equations, with 5 independent variables for each potential light source: 2 variables indicating the direction of the light (for example, bearing and azimuth), and 3 variables indicating the red, blue, and green intensity, respectively. The number of equations is equal to the number of data points in the image for which surface normal and reflectance are available times the number of color components, typically 3. However, an important constraint is the requirement that the light intensities must not be negative. This latter requirement precludes solving the system using a standard method for linear systems, and instead requires a more sophisticated method, such as a linear programming technique, or the algorithm known as nonnegative least squares. These special techniques require significantly greater computer time to solve than the same system would require without the constraints of non-negativity. This approach was brought forth by those in the art, as mentioned above.

SUMMARY OF THE INVENTION

Therefore it is an object of the present invention to provide a method for matching a 2D image to one of a plurality of 3D candidate models contained in a database in which an object is identified without the need for solving for light sources or other complex and costly computations such as eigenvector determination.

It is a further object of the present invention to provide a method for matching a 2D image to one of a plurality of 3D candidate models contained in a database which has relatively lower costs over prior art methods that solve for lighting.

It is yet a further object of the present invention to provide a method for matching a 2D image to one of a plurality of 3D candidate models contained in a database which is simpler than prior methods.

It is still yet a further object of the present invention to provide a method for matching a 2D image to one of a plurality of 3D candidate models contained in a database which does not require iterative algorithms that take one to two orders of magnitude more computer time on the size of problems involved.

Accordingly, a method for matching a two dimensional image to one of a plurality of three dimensional candidate models is provided. The method comprises the steps of: determining the position and orientation of an object giving rise to the two dimensional image; computing a representation of lighting effects that allows the lighting that gave rise to the two dimensional image to be used to render a realistic image of a three dimensional model; successively rendering each three dimensional candidate model in the determined position and orientation using the surface normals in conjunction with the corresponding computed representation of lighting effects; and comparing the two dimensional image with each of the rendered three dimensional candidate models.

Another method for matching a two dimensional image to one of a plurality of three dimensional candidate models is also provided. This method comprises the steps of: determining the position and orientation of an object giving rise to the two dimensional image; computing a representation of lighting effects based on the plurality of three dimensional candidate models and the two dimensional image that allows evaluation of the likelihood that a particular three dimensional candidate model gave rise to a particular two dimensional image; and choosing the most likely model to have generated the query based on the computed representation of lighting effects.

In a first variation of the methods for matching a two dimensional image to one of a plurality of three dimensional candidate models, the method comprises the steps of: determining the position and orientation of the two dimensional image; for each three dimensional model, computing a histogram-like table having a computed brightness coefficient for each surface normal of the model based on the corresponding value in the two dimensional image, each brightness coefficient depending only on the corresponding surface normal; successively rendering each three dimensional model in the determined position and orientation using the surface normals in conjunction with the corresponding computed brightness histogram-like table; and comparing the two dimensional image with each of the rendered three dimensional models.

In a second variation of the methods for matching a two dimensional image to one of a plurality of three dimensional candidate models, the method comprises the steps of: determining the position and orientation of the two dimensional image; for each three dimensional model, computing a histogram-like table having a computed brightness coefficient for each surface normal of the model based on the corresponding value in the two dimensional image, each brightness coefficient depending only on the corresponding surface normal; computing the variance of the brightness coefficients that are used to create each bucket of the histogram-like table, a bucket being a set of similar normal values that are lumped together to form a single argument value in the histogram-like table; computing the sum of the variances of the histogram-like table buckets; and ranking the three dimensional models using its computed sum as an error function, the ranking indicating the likelihood that the corresponding three dimensional model matches the two dimensional image.

Still further provided is a program storage device readable by machine, tangibly embodying a program of instructions executable by the machine to perform the method steps of the methods and variations thereof of the present invention and a computer program product embodied in a computer-readable medium for carrying out the methods, and variations thereof, of the present invention. Preferably, the computer program has modules corresponding to the steps of the methods and variations thereof of the present invention.

BRIEF DESCRIPTION OF THE DRAWINGS

These and other features, aspects, and advantages of the methods of the present invention will become better understood with regard to the following description, appended claims, and accompanying drawings where:

DETAILED DESCRIPTION OF THE PREFERRED EMBODIMENT

Figure 1:
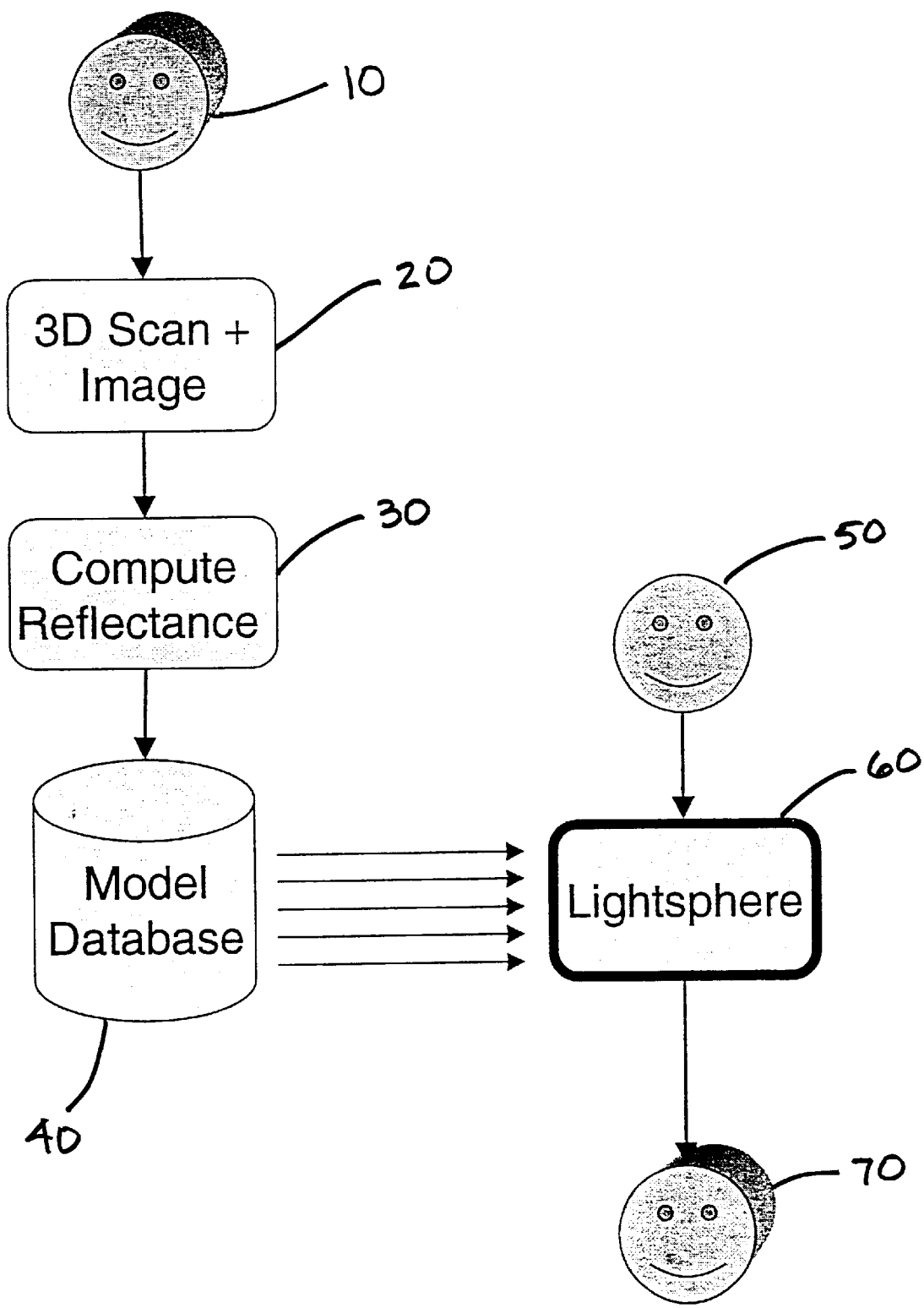
FIG. 1 illustrates a schematical representation of the method of the present invention.

Although this invention is applicable to numerous and various types of objects to be recognized, it has been found particularly useful in the environment of human face recognition. Therefore, without limiting the applicability of the invention to human face recognition, the invention will be described in such environment.

The methods of the present invention, have an efficient method of comparing a query photograph, such as a face of a person to be identified to one of a plurality of 3D models contained in a database. The methods of the present invention presupposes a particular model of reflectance, known as the Lambertian assumption. Although the invention is robust against deviations of the true details of reflectance from this model, the relevant point is that this is a functional relationship between the data in the query and the data in the model, i.e., there is an equation that relates the query and the model. The methods of the present invention can be viewed as an efficient way of measuring to what degree the expected form of this functional relationship holds between the query and the putative model from which it arose. This measure can be generalized; for example, the statistical notion of correlation is a generalization of functional relation.

Another generalization, which arose primarily in information theory, depends on the entropies of the distributions governing the objects we want to compare. These distributions, for example, could govern the point values of different measurements in the two objects. Entropy can be regarded as a measure of uncertainty, i.e., the greater the entropy, the more difficult it is to predict the outcome of drawing a sample from a probability distribution. When we have two random variables with a joint distribution, e.g. the data values of a 3D model and of a 2D image putatively of that model, it can be determined to what extent does knowing the value of one of these random variables, say a 9-point patch on the 3D model, help us predict the value of the other variable, say the intensity at a corresponding pixel in the 2D image. This question is quantified by taking the difference between the entropy of the marginal distribution of the second variable, and subtracting off the entropy of the conditional distribution of the second variable given the first. This yields how much our uncertainty decreased thanks to knowledge of the first variable. This can be summarized by:

$$I(Y;X)=H(Y)-H(X|Y) \quad (1)$$

where H denotes entropy, X is the first random variable, and Y is the second random variable. This quantity, denoted by I(Y;X) is known as the mutual information between X and Y. It is symmetric, and is also equal to $$H(X)+H(Y)-H(X,Y) \quad (2)$$

where H(X,Y) is the entropy of the joint distribution of X and Y.

Thus, the methods of the present invention can be thought of as a particular approximation to measuring the mutual information between the (distributions governing the) 3D model and the 2D query.

In a system where a 2D photographic query is to be matched to a 3D model in a large database of such models by predicting the appearance of each model under the pose and lighting conditions that created the query, the methods of the present invention avoid the problem of solving for the light sources that produced the query image by using each successive 3D model as a candidate solution, and in conjunction with the query, building a histogram-like table that specifies a brightness coefficient for each surface normal which depends only on the normal. In one variation of the methods of the present invention, the model is then rendered in the already approximately known pose using these brightness coefficients, and the resulting image is compared to the query image and an error is computed. This error determines a ranking of the models for the purpose of identification. In another variation, no rendering is done, and instead the variance of the samples in each "bucket" of the brightness vs. normal histogram-like table is computed, and this variance, possibly weighted by the number of samples is summed over all buckets to yield a quality measure, which is then used for identification in the same way as an error measure.

It is assumed that there is a good, though not necessarily exact, solution for the pose of the query. However, it is not known which model generated the query image, and it is not known what were the lighting conditions for the query.

The method of the present invention therefore proceeds as follows:

a. Assume, in turn, that each model is the "correct" one.

b. Using the query image, compute a histogram-like table that associates a "brightness" coefficient with each normal. (For color images, three such coefficients are preferably computed, one for each color component, typically red, green, and blue).

There are then 2 preferable variations for the method. The first is as follows:

c1. Use the normals of the model under consideration in conjunction with the normal/brightness histogram computed in step (b) to render a picture of the model under putatively the same lighting conditions as were present when the query was photographed.

d1. Compare the query with the rendered picture to rank the likelihood that this model is in fact the correct one.

The second variation replaces the last 2 steps with these:

c2. Having saved additional information when constructing the normal/brightness histogram, compute the variance of the brightness coefficients that were used to compute each bucket of the histogram. (A "bucket" is the set of similar normal values that are lumped together to form a single argument value in the histogram.)

d2. Compute the sum of the variances of the histogram buckets, weighted by the number of samples in each bucket. Use this sum as an error measure in ranking the models to select the correct one.

In step (b), solving for the lighting in the paradigm that was discussed above as step (2) is avoided. However, in step (c1), it is still possible to perform the rendering that is called for in step (3) of the paradigm. In the alternate evaluation steps, (c2) and (c3), it is possible to avoid rendering altogether in assessing the likelihood of a match between a 3D model and a 2D photograph query.

The methods of the present invention are thus based on the observation that computing the light sources, i.e. the lighting, that produced the query image, is only an intermediate step in a process whose real goal, in the context of the overall system, is to render the identification candidate under those lighting conditions for the purposes of comparison to the query, or indeed to compute the relative likelihood that the model matches the query even without doing such a rendering but with equivalent results.

What is ultimately being measured is the consistency of the imputed brightness coefficients associated with each normal. Because the 3D model's normals and reflectance values are used in conjunction with the query's observed intensities, this is a measure of the error in fitting the 2D photograph query to the 3D model.

The methods of the present invention are based on a Lambertian model of reflectance. The Lambertian assumption is that the intensity projected onto a point in a monochrome photograph of an object lit by a point source of light depends only on the following quantities:

R, the "reflectance" at the point of the object that gives rise to the corresponding point in the picture, N, the "normal" to the surface at the point in question (i.e. the unique perpendicular direction to the surface at that point), L, a unit vector representing the direction from the point to the light, and b, the intensity of the light source at the point.

In particular, the observed intensity in the picture does not depend on the viewpoint, but only on the intrinsic properties of the object, and the lighting direction and intensity.

The observed image intensity is described by the equation:

$$I = R\, b\, L * N \qquad (3)$$

where I is the image intensity at the image point in question, and * is the usual vector dot product.

If the quantities R, b, L, and N are given at each point, then in order to make a rendering from a 3D model, one need only perform the multiplications in equation 3. Also, it must be determined which portions of the model will be visible; however, that can be performed adequately by existing computer graphics techniques.

The situation in the model identification problem being solved is that R and N are known for each model, I is known from the query, and b and L are unknown. One approach, involving step (2) in the paradigm discussed above, is to solve for b and L, and then perform the multiplication in equation 3.

The approach of the methods of the present invention is to attempt to solve only for the composite quantity $bL*N$, and then (in the first variation mentioned above) perform the multiplication in equation 3.

At each point, equation 3 is divided to give $$b\, L * N = I/R \qquad (4)$$

call this quantity B(N), a brightness coefficient.

After rendering, equation 3 becomes $$I_{rendered} = B(N) R \qquad (5)$$

If this were done at just one point, this is a triviality, and we would simply get back the query's 'I' that we started with. However, in general, for every normal that occurs in the model, there will be many other points with the same or nearly the same normal. If all the B values that we get are averaged whenever the same normal occurs, and equation 5 is used to render a picture from the model, we will get only an approximation to the 'I' in the query. If the different values that were averaged to obtain B(N) for a given N were different due to small variations in material properties, measurement error, nonlinearities, etc., but the query did in truth match the model, then it can be expected that the average represented by B(N) would be a good approximation to the number needed for equation 5 to give a good approximation to the observed query intensity. However, when the query does not in truth match the model, because the values of N that are being used come from the model, while the intensities, I, come from the query, it can be expected that the correlation among B(N) values will be poor, and the average, when inserted into equation 5 for rendering, is unlikely to give a result which is close to the value in the query. In that case the rendering will be found to have a larger error from the query than in the case where the query in truth did match the model.

B is a function which takes a surface normal vector to a number, i.e., B: $S^2 \rightarrow R$ where $S^2$ is the so-called Gaussian sphere, which is the space (or manifold) of all possible normal directions to a surface embedded in 3 dimensional space. The 2 denotes the fact that this sphere is 2-dimensional, like the surface of a common ball. For this reason, the method of the present invention is referred to as the "lightsphere" method, since it attempts to find a brightness function defined on the Gaussian sphere.

So far, the situation has been presented with a single point light source and a monochrome picture. To generalize from monochrome to color, the monochrome case is done 3 times, once for each color component.

Generalizing the lighting, other than its color, is not as simple. In general the lighting can be, and usually is, much more complex than a simple point source. Any point of the surface can have light impinging on it from all directions, in the hemisphere visible to it, and this lighting can vary from point to point. At each point, the lighting is also a function on the Gaussian sphere, prescribing the intensity of light coming from the direction represented by that point on the Gaussian sphere. In general, this function can vary from point to point throughout space, and therefore can vary on the surface we are imaging. If the further assumption is made that all the lights are infinitely far away, then the lighting function does not vary from point to point, and the global lighting can be thought of as a function on the Gaussian sphere.

To generalize equation 3 to this situation, we simply integrate over the Gaussian sphere, or approximate the integration by a summation. There is a small complication in that a nonlinearity is introduced because only the lights with a direction that result in a positive dot product with N make a contribution; there is no negative brightness from lights behind the surface. However, this does not disturb the key point, which is that the new lighting equation, which is now something of the form $$I = Rf(N) \qquad (6)$$

still uses the exact same light distribution whenever the same normal is encountered, and therefore the computation of equation 4 and the rendering of equation 5 are just as valid as with a single point source. It should be noted that for both equation 3 and equation 6 to be independent of position and depend only on normal, it is assumed that there are no "cast shadows". Cast shadows are shadows that are caused by non-local interactions, such as when the nose casts a shadow onto the cheek; these are distinguished from "attached shadows" which occur as the object smoothly curves away from the light source, as occurs when only the lit part of the moon is visible at night. The methods of the present invention neglect the effect of cast shadows.

In fact, with more complex lighting, when we are attempting to match a wrong model, the fact that different light sources will come into play in the query, for the same normals on the model, will result in an even larger error when matching the wrong model, with no similar increase in error when matching the correct model. Hence, this lighting nonlinearity actually enhances the effectiveness of the invention.

A similar observation applies with regard to specularities. The location of specularities in an image violates the Lambertian assumption of equation 3 in two important ways:

1. The location of the specularity depends on the camera viewpoint; and
2. The brightness of the specularity does not vary linearly with either the lighting vector or the normal vector.

These problems make it difficult to incorporate specularity into any system which must solve for light sources, though it is by no means impossible. Consequently, specularities often lead to increased error.

However, if we continue to assume that the light sources are at infinity, and there are no cast shadows, then even in the presence of specular reflection, equation 6 still applies approximately. More specifically, the new equation is $$I=Rf(N)+Sg(N) \quad (7)$$

where S g(N) represents the specular component of the reflected light. S is the shininess of a particular point of the surface, in analogy to R, while g(N) captures the intensity variation as a function of the normal.

When we apply the lightsphere calculation of equation 4 to equation 7 we get $$I/Rf(N)+Sg(N)/R \quad (8)$$

However, if this is to be B(N), a problem arises because R and S depend on the position on the surface, and not on the normal. This means that the quality of the rendering that can be achieved with the B(N) that can be computed as the average of the above values I/R will depend on the degree of variation of R and S at the normals involved. Nevertheless, the rendering will approximate some specular component where it exists, and will therefore be closer to the exactly correct rendering than one based simply on rendering from computed lights with a Lambertian rendering equation. Of course, with another method, one can compute the lights based on some nonlinear model that includes specularity, and render with that model. However, in the methods of the present invention, this is achieved at no increase in complexity; with other methods, the specular reflectance equation would have to be explicitly modeled, with a concomitant increase in complexity and computational cost.

Conversely, when the wrong model is rendered for the query, because specularities tend to have quite bright components, wildly inappropriate values for B(N) are expected when there are specularities. This leads to proportionately greater error added to the wrong model's ranking than to the right one's. Hence, specularity in the query can actually enhance the effectiveness of the invention.

We note that the measures corresponding to the two variations of the methods of the present invention are closely related. The two measures are, respectively, (1) error between rendered image and query, and (2) weighted variance of lightsphere coefficient values within each bin. Each coefficient that entered into the variance computation arose from a point in the query. When that point is rendered with the average lightsphere coefficient for its normal's bin, the error will be proportional (via the reflectance) to the difference between the average coefficient being used in the rendering and the exact coefficient that was used in computing the average. Were it not for the reflectance multiplier, when summing over the points that fall into the bin, the sum of the squares of the one set of errors is the same as the sum of squares of the differences, and the latter is exactly the variance of the bin weighted by the number of samples. Thus, the two measures differ only by a weighting factor of reflectance in the error sums. It is to be noted that by error between images, it is meant RMS (root mean square) error, or equivalently, SSD (sum of squared differences). Other error measures are possible, as well.

The invention is intended as a component in a larger system whose function is to store numerous 3D models of objects, and upon presentation of a query image to provide the most likely stored model corresponding to the query. A schematic illustration of such a system is presented in FIG. 1. Asynchronously, and over arbitrary lengths of time, the system is presented with 3D objects 10, typically human heads and preferably human faces, which it scans and digitizes with a scanning device 20, at the same time capturing the reflected light image at all included 3D data points. A reflectance estimation module 30 computes a reflectance function for the 3D object 10. This information is then stored in a database 40. This storage can include information about surface normals, or surface normals can be computed as needed at later stages when the data is to be used.

At an arbitrary time, a query photograph 50 is presented to the system for identification. A lightsphere 60 is used to compare the 2D query 50 to each of the stored 3D models 10 and to select a best match 70. Not shown is a separate module which computes the pose for a given query and model, possibly based on other stored data. This pose information is needed by the lightsphere module 60.

Figure 2:
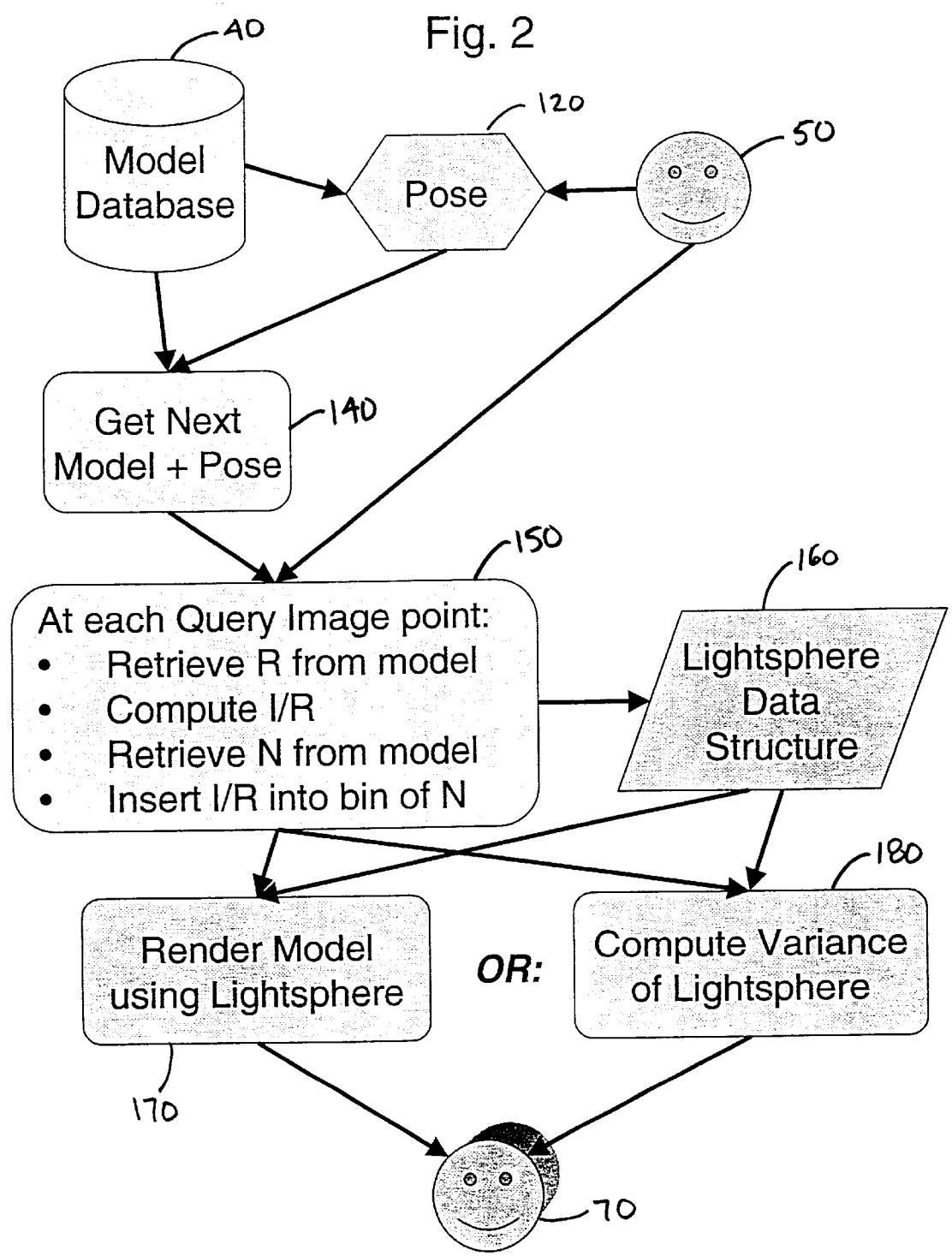
FIG. 2 further illustrates the lightsphere module of FIG. 1.

FIG. 2 illustrates the lightsphere module 60 of FIG. 1 in greater detail. The query image 50 is presented for identification. The lightsphere module 60 has a sub module 140 which sequentially considers one model 10 at a time for similarity to the query image 50. To do this it obtains the next model 50 from the database 40, and obtains from a pose module 120 the pose solution for that model 10 and query image 50. This is needed to establish the putative corresponding points of the query image 50 and the model 10. The pose solution operation may have been done earlier for all models 10 with this query image 50, or it may be done upon demand by the lightsphere module 60.

The main loop of the lightsphere module 60 iterates over the image 50 by means of sub module 150. Using the correspondence from the pose module 120, at each point of the image 50, it retrieves the reflectance R from the model 10, and uses the intensity in the image 50 at that point, I, to compute the brightness coefficient I/R. It then retrieves the surface normal N of the model corresponding to that point, and uses it to determine where in the lightsphere data structure 160 to insert the brightness coefficient I/R. This insertion may consist of a simple summation, or a record of the values inserted, depending on which variation of the algorithm is performed in the final step. The first variation of the final step consists of a module 170 for making a rendering of the model using the information stored as a sum in the lightsphere data structure 160. The sum is preferably converted to an average. This rendering is then compared to the query image 50, and the RMS error is computed for significant points as described above. This error is saved as an error measure for that model. Alternatively, in the second variation of the final step, the model 10 and query image 50 are not referred to again, but rather the record of entries in the lightsphere data structure 160 is used in a module 180 to compute the variance in each bin, and a weighted sum of these variances is used to derive an error measure. This error measure is then saved as the error for that model. Finally, the model 70 with the best error measure is selected and output as the best match to the query image 50.

Figure 3:
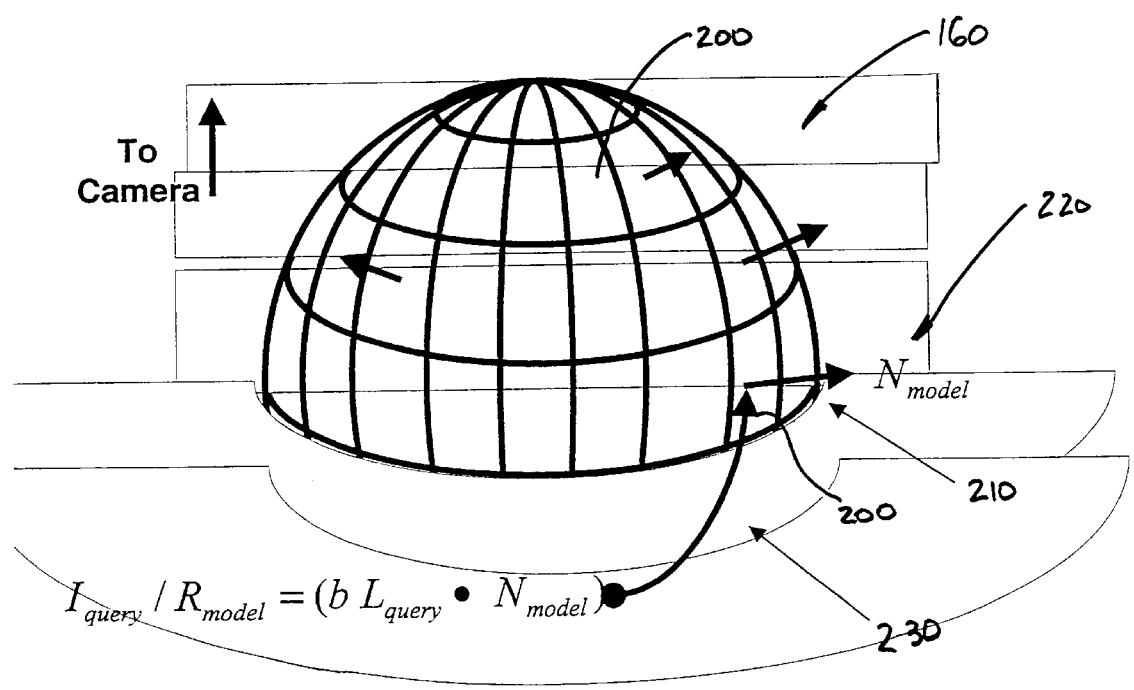
FIG. 3 illustrates a graphical representation of the lightsphere data structure of FIG. 2.

The operations on the lightsphere data structure are presented in more detail in FIG. 3. The data structure itself 160 consists of a set of bins 200 that tesselate a hemisphere of the Gaussian sphere. Every surface normal 210 of a point visible to the camera lies within one of these bins 200, since points with normals on the other hemisphere are not visible. As the method iterates through the query image 50, it computes I/R (2) which under the Lambertian model we expect to be the same as b L*N (2). The value of N (220) that is known for this point from the model 10 is the value used to choose the correct bin 200 of the data structure 160, and the value I/R is then inserted (230) into this bin 200, either by summing, or recording the values inserted into the bin 200, depending on which variation of the methods of the present invention is being used.

Although the model evaluation process has been presented as a sequential one, where only one model is being evaluated at any time, as discussed above, it is possible to divide attention among numerous models using partial solutions so that the cost of fully evaluating a model is only expended if the model continues to have a low error in competition with other models.

Also, prior to the final error ranking process, lightsphere results for one model do not require results for any other model. Consequently, the overall process trivially admits of massive parallelization, with a proportional increase in overall speed.

The lightsphere module 60 will now be described in greater detail. The lightsphere module 60 can be divided into two stages:

1. Preprocessing steps that:
   a. Compute the pose of the model that best accounts for the query.
   b. Generate a registered map of the surface normals of the model corresponding to points on the query.
   c. Generate a registered image of the model's reflectance corresponding to points on the query.
2. Using the information provided in stage 1, in conjunction with the query image, to compute the lightness coefficients on the Gaussian sphere.

In stage 1, the pose is computed by any of numerous methods of the art which can be used for this purpose. Generating the registered maps of normals and reflectance is done by standard and well-known computer graphics methods. Note that computing the reflectance that is associated with the 3D model is not a simple procedure, but since such procedures are known in the art, a description of its computation is omitted. One such method for computing the reflectance associated with the 3D model is to simply use images taken under flat lighting conditions.

The input to the preprocessing stage consists of a query image Q, a candidate 3D model M, and a camera model K. The output of the preprocessing stage comprises a pose T, a registered reflectance image R, and a registered normal map N. The input to the lightsphere module consists of the query image Q, the registered reflectance image R, and the registered normal map N. The output of the lightsphere module comprises a normal-lightness table B, and an error measure E.

These inputs and outputs will now be precisely explained, as will exactly how to compute the lightsphere output. Note that the definitions being used in this section differ slightly from the definitions used above.

For simplicity, only a monochrome image is considered. For a color image, the process to be described below is repeated separately for each color component, e.g., red, green, and blue.

The query image Q is considered to be a function defined on the real plane, i.e., $$Q: R^2 \rightarrow R^+ \tag{9}$$

This notation means that Q is a map from the 2-dimensional real Euclidean plane to the nonnegative real numbers. It is assumed that Q only takes nonzero values, or is only defined, in some finite rectangle of the plane. In actual fact, Q is sampled at only a finite discrete grid of points, so that it takes values at only integer coordinate values. Note that Q is a function, while the notation Q(p), where p is a point in $R^2_2$, denotes the real number to which Q maps the point p.

The 3D model M consists of several subparts. These include a set of n points $$\{p_i | i=(1, 2, \ldots, n)\} \tag{10}$$

in $R^3$ which are the locations of sample points on the model, and a corresponding set of n real numbers $r_i$ which represent the surface reflectance at each corresponding $p_i$.

The camera model K is a perspective projection. I.e., $$K: R^3 \Delta R^2 \tag{11}$$

where, after some change of coordinate systems by rigid motion, $$K(x,y,z)=a^*(x,y)/z, \tag{12}$$

for some positive real number a. The change of coordinates is part of the camera model. There are many other ways to formulate the definition of perspective projection; this one is equivalent, and the exact formulation is not important. For the purposes of the lightsphere computation, distortion effects of the camera are not considered, and the camera model is fixed. Variations where more information about the camera is used are obvious. Note that this definition allows for some amount of perspective distortion, depending on the values of the camera model K and the position of the 3D model in space. However, to the degree that the true camera and subject location for the query lead to more or less perspective distortion, this difference is not compensated for in what is described below, although a more detailed camera model could accomplish this.

The pose T is the rigid motion in $R^3$ which, when applied to the model M, after projection through the camera model K, brings the image of the model M into the best registration with the query Q.

I.e., the pose T tries to satisfy the following equation:

$$K(T(p_i))=q_i \tag{13}$$

where $p_i$ is a point of the 3D model, and $q_i$ is the corresponding point of the query image, simultaneously for some set of points $p_i$ and $q_i$.

The registered reflectance image R is a map $$R: R^2 \Delta R^+ \quad (14)$$

(Note that the first R is a different R than the 2nd and 3$^{rd}$.) sampled on the same grid as the query image Q, such that $$R(K(T(p_i)))=r_i \quad (15)$$

In other words, R tells us, given a point in the query image Q, what the reflectance is of the point in the model that projects to that point in the query given the pose and camera model. Note that several points on the model might project to a single point in the query; i.e. the computer graphics technique of hidden surface elimination is necessary to find the unique R that corresponds to the surfaces of the model that are actually visible under the assumed pose and camera model. Numerous well-known computer graphics techniques exist that can accomplish this. Both proprietary and freely available packages have ben used to do this computation with equal success.

The surface normal $n_i$ to a point $p_i$ of the 3D model M is a unit vector in $R^3$ which represents the direction at right angles to the surface of M at $p_i$. Computing $n_i$ requires knowing some nearby points of M, i.e. nearby on the surface that M represents. In our apparatus, this is known in advance because the data in M comes from a system that essentially produces a raster scan. In addition, there are standard computer graphics techniques that allow putting a less ordered set of points into a form where such neighboring points are known, for example, by the process known as triangularization of the surface. If p has the neighbors q and s, then the unit normal at p can be computed by $$v=(p-q)\times(p-s) \quad (16)$$

$$n=v/\|v\| \quad (17)$$

where X is the vector cross-product, and $\|v\|$ is the norm of v.

In practice, it is often better to consider several neighbors of p, e.g. in a grid, the 8 or 4 neighbors, and take the average of the values thus computed.

Because n is a vector in $R^3$ it can be written as $$n=(n_x, n_y, n_z) \quad (18)$$

where the three components are the components of n in the x, y, and z directions, respectively. However, the requirement that n be a unit vector imposes the constraint that $$1=\|n\|^2=n^2_x+n^2_y+n^2_z \quad (19)$$

This can be viewed as the equation of a 2-sphere, i.e., the surface of a ball in 3-space. Geometrically, if n is considered to be anchored at the origin, as n varies among all possible values for a unit vector, its tip varies over the surface of the unit sphere. Therefore each n can be identified with these tip positions, i.e. with the points of the 2-sphere. The 2-sphere is commonly denoted by $S^2$.

When this identification is made between the unit normals of a surface and the 2-sphere in differential geometry, the sphere is commonly referred to as the "Gaussian sphere", and the map which maps each point of the surface to its normal is known as the "Gauss map".

With this in mind, the registered normal map can be defined as a map $$N: R^2 \to S^2 \quad (20)$$

which takes each point in the query image Q, to the surface normal at the point of the 3D model M which projects to that point of Q under the pose T and camera model K. I.e., N is defined to satisfy $$N(K(T(p_i)))=n_i \quad (21)$$

in analogy to the similar equation (15) for the registered reflectance, where now $n_i$ is the normal calculated in the preprocessing stage at the point $p_i$.

N, again, is calculated only at the grid points associated with the grid points of Q. The calculation of N, like the calculation of R, requires hidden surface removal to guarantee that only the value of n for the visible surface is used. Again, this is most easily done by using existing standard computer graphics techniques. One can take advantage of existing graphics interfaces to do this by allowing the graphics engine to compute renderings with 6 different light sources: one for each combination of positive and negative coordinate direction, i.e., lights coming from +−x, +−y, +−z. With a Lambertian rendering model in the graphics engine, these will yield the positive and negative components of the normal vector at each point. This also allows the use of the graphics engine's techniques for interpolation, which helps considerably in the performance of the algorithm.

The lightsphere algorithm calculates a normal-lightness table B from the query Q, the registered reflectance image R, and the registered normal map N.

Before we define and describe how to compute B, consider first the map $$A: S^2 \to R^+ \quad (21)$$

given by $$A(n)=Q(q)/R(q) \quad (22)$$

when N(q)=n.

For notational compactness, define $$D: R^2 \to R^+ \quad (23)$$

by $D(q)=Q(q)/R(q)$. $\quad (24)$ (Elsewhere this is referred to as I/R.)

We would like A to be defined by $A(n)=D(N^{-1}(n))$. However, there may be many points where the normal is n, so that $N^{-1}(n)$ is not a single point, but a set of points. To estimate A, it is desirable to take the average of D on this set of points. I.e., suppose that $$P(n)=\{p|N(p)=n\} \quad (25)$$

is the set of points in the query that map to the normal n. Our goal is to define A by $$A(n) = \frac{1}{\#(P(n))} \sum_{P(n)} D(p) \quad (26)$$

where #(P(n)) is the number of points in the set P(n) (or the measure of the set, in the continuous case). This is a well-defined quantity.

However, this is not adequate when a discrete grid, in this case the discrete grid of the query image is being operated on. The problem is that the normals are derived from the 3D model, and in general the values to which they have been discretized depend only on the accuracy of the 3D model data and the method whereby the normals were computed. In particular, they will generally be discretized to such a fine degree that it is unlikely that any two of the discretized points $q_i$ of the query will map to the same normal n, and therefore almost every A(n) will arise from only a single sample. In that case, the lightsphere calculation, when used to render an image from the model will be trivial, i.e., it will result in exactly the query image value, since we will simply be computing the quantity $$I(p)=A(N(p))\ R(p)=D(p)\ R(p)=Q(p)/R(p)\ R(p)=Q(p) \quad (27)$$

Therefore, it is essential that a way be devised that in general, several values will be averaged to obtain A(n). A way to do this is to discretize the Gaussian sphere into a small enough number of bins (or buckets) that a sufficient number of buckets contain more than one sample. There are numerous ways to discretize the 2-sphere. For example, on can take an icosahedron centered at the same point as the sphere and radially project the icosahedron to the sphere. This give a partition, or tesellation, of the sphere. However, for our purposes it has been found that it works well to use an extremely simple method of discretizing the sphere, which can now be described.

We start with a unit normal vector $$n=(n_x,n_y,n_z) \quad (28)$$

In the methods of the present invention, surface normals that point away from the camera are not of interest, because the camera cannot see any surface point that has such a normal. By "point away from the camera", it is meant that if v is a vector that points in the direction of the camera perspective projection center from the point p on the surface, and n is the outward pointing normal at the point p, then if n*v <0, where * is the vector dot product, we say that n is pointing away from the camera. Thus only normals n on half of the Gaussian sphere are of interest, the half where the above inequality does not hold. Let us for the moment use a coordinate system where the camera axis lies along the z axis and the camera is in the positive z direction from the subject. Then the set of all surface normals we are interested in is exactly those where $n_z>0$. This can be thought of as a hemispheric cap lying on the x–y plane.

Now our goal is to discretize this hemispheric cap based on the values $n_x$, $n_y$, $n_z$. The easiest way to do this is to ignore the z component altogether, and consider only the projection of the hemispheric cap onto the x–y plane, which is a circular disk. We will discretize this disk, and define the discretization of the hemisphere by the projection back up along z from the plane to the hemisphere. To discretize this disk, the unit disk in the plane, we will simply discretize the unit square in the plane, and restrict it to the disk. To simplify the next discussion, consider the unit square to be the part of the plane given by $$0<=x<1\ \text{and}\ 0<=y<1. \quad (29)$$

(Since the values of the unit normal components vary from −1 to +1, this involves a scale and shift; in an actual program, one would probably not bother to do this).

The way to do this is as follows. We will discretize so that there are m bins, i.e., into an m×m square tesselation. Divide the unit square into $m^2$ subsquares $S_{ij}$, i,j=1, 2, ..., m, as follows. A point p of the unit square is in subsquare $S_{ij}$ if $$(i-1)/m<=p_x<i/m\ \text{and} \quad (30)$$

$$(j-1)/m<=p_y<j/m \quad (31)$$

where $p_x$ is the x coordinate of p and $p_y$ the y coordinate.

Then considering each subsquare $S_{ij}$ a "bin" or "bucket", we say that p falls into the (i, j) th bucket if the above conditions (30) and (31) are satisfied.

Using this definition, a unique bucket (i,j) can be defined for each unit normal n as follows. First, because a shift and scale was done, define $$n'=[n+(1,1,0)]/2 \quad (32)$$

This moves and shrinks the hemisphere to lie over the unit square as it was defined above. (This is only necessary because simple notation is desirable; this entire analysis is identical with a square that goes from −1 to +1 in x and y.)

Now just compute i and j according to (30) and (31), using $n'_x$ in place of $p_x$ and $n'_y$ in place of $p_y$, $n_z$ is simply ignored, which has the effect of projecting the square up to the hemisphere. These (i,j) coordinates define the bins for the basic lightsphere procedure. Note that these are not of uniform size on the Gaussian sphere; however, this is not very significant in practice, as they are uniform in the query image.

Now the algorithm can proceed by systematically iterating through the points of the query image. First, it must keep 2 items of data for each bin: a running sum, and a count of the number of samples used thus far in the sum. (Since the count is used to compute an average, an updating method could be used to maintain only a single number for each bin, but this is not worth the bother since the table is small.) Then as the algorithm iterates through the query image Q, at each point p it refers to the reflectance image R and the normal map N. It computes the value of D(p)=Q(p)/R(p) and adds this value to the (i,j)th bin where (i,j) are computed according to (30) and (31) from the value of the normal N(p). (with the understanding that by this it is meant that the same scale and shift operation that gave n' above is taken into account, here and in what follows.) Also it increments the count for the (i,j)th bin. Once it has finished iterating through the query image, it divides the sum at each bin by the count at that bin to arrive at an average. This results in a table of numbers B(i,j) that are the B(n) mentioned above, the lightness table.

In practice, as explained above, additional criteria are used to decide whether to include a particular query image point in the above computation. For example, image points that are too bright or too dark are excluded.

So far the methods of the present invention have been explained for the variation where the error between a rendered image of the model and the query image as our quality criterion is used.

To render an image using the lightsphere data structure B(i,j) the algorithm proceeds as follows. It iterates through the registered reflectance image R. At each point p of R, it looks up the normal N(p) in the registered normal map N. Using the value of N(p) thus retrieved, it computes the corresponding lightsphere bin (i,j) using (30) and (31), and retrieves the value B(i,j). It then computes $$I(p)=R(p)\ B(i,j) \quad (33)$$

and sets the brightness value of the rendered image I to that value, after clipping to avoid values larger than the maximum brightness.

Actually, there is an additional step before the last computation is done. Because there are a very small number of bins compared to the number of actual normal values, using the value B(i,j) directly as above results in considerable artifact due to the coarse digitization of the bins. Therefore, instead an interpolated value B' (p) is used. The interpolation is based on the value of the normal N(p). Since we know where N(p) falls in the square defined by the (i,j)th bin, we simply use bilinear interpolation with the adjacent values of B(i,j) to arrive at the interpolated B'(p), which is then used to compute $$I(p) = R(p) B'(p) \quad (34)$$

The error E is then computed as the sum of square differences or root mean square error between the query image Q and the rendered synthetic image I, which are already registered by virtue of the method of construction of I.

Now we return to the variations of the algorithm that use the variances of the lightsphere. This proceeds identically to what was described above, except that the data that is associated with each bin is slightly more complex. Rather than keep a running sum and a count for each bin, instead for each bin a list is kept of all the D(p) values that fell into that bin. When the iteration is completed, the mean and variance of the list of values in each bin is computed for that bin. The mean is identical to B(i,j) defined above. In addition, we also now have the variances v(i,j).

In the first variation using variances, the error E is defined as the sum of these variances, i.e., $$E = \sum_{i,j} V(i, j) \quad (35)$$

In the second such variation, we want to weight this sum by the counts, which will be more similar to the sum of square differences between the rendered and query images used earlier. Call the counts that were kept in the accumulation process C(i,j). Then in this variation, the error measure is given by $$E = \sum_{i,j} C(i, j) V(i, j) \quad (36)$$

It should be noted that although a few very specific methods to accomplish the lightsphere computation have been presented, there are other formulas and algorithms that could be used for the various components and for the error term. These equations and explanations are merely the description of one possible way to achieve an embodiment of the invention, and many other ways are possible with simple modifications and/or additions.

EXAMPLE

The methods of the present invention have been actually reduced to practice in both the C and C++ programming languages and tested on a pilot database containing 37 3D models, and actual queries consisting of 37 subjects in all combinations of 7 poses and 6 lighting conditions.

Several additional techniques can be utilized to optimize the performance of the methods of the present invention which have been actually reduced to practice.

1. It has been found that a grid of 32×32 bins for the lightsphere histogram works well for images and models with a resolution of 640×640. 24×24 bins also works well. The number of bins imposes a tradeoff between accuracy in the brightness coefficient—the accuracy increases as there are more bins, since a smaller range of normals is used in the averaging—and statistical significance of the average, which improves as the number of bins is decreased, since a greater number of normals then fall into each bin. Thus, the methods of the present invention can be further improved by estimating the magnitude of these effects upon seeing the data and choosing an appropriate number of bins.

2. It is possible to use a tesselation of the Gaussian sphere for the bins. This improves the performance at the expense of a slightly greater cost in computing the lightsphere histogram and rendering from it. Furthermore, it has been found that projecting a tesselation of the unit disk onto the Gaussian sphere, i.e. using only x and y values, not z, for determining the bins, is quite effective, despite the sampling inequities it introduces.

3. Because the histogram bins are quite coarse relative to the image and model resolutions, it has been found that bilinear interpolation of the lightsphere values when doing rendering greatly improves both appearance and accuracy.

4. For a Lambertian object, the dot product in the integral which gives the image intensity reduces to a cosine between normal and light directions. The resulting image intensity as a function of normal is essentially a convolution of this cosine with the light intensity distribution. This amounts to a low pass filter operation in the absence of cast shadow. Thus, in a system which solves for lighting and then does rendering, there would be enforced a smoothness upon the brightnesses as a function of normal by virtue of this convolution. In the methods of the present invention, the lightsphere computation does not contain such a mechanism to enforce smoothness. Consequently, the lightsphere data can contain variations with high frequency components that result from multiple sources, such as departure from Lambertian, reflectance errors, etc. Therefore, it has been found useful to do a small amount of smoothing on the lightsphere histogram. This can be done by a convolution with a simple small box function. This significantly improves the rendering and the performance of the method.

5. When using equation 4 to compute the lightsphere data structure, points with very low reflectance can contribute enormous numbers when the division is performed. Such points lead to meaningless results. To avoid this problem, a minimum threshold is used which the reflectance must exceed before it can enter into the computation. This threshold is currently set ad hoc; however, it could also be computed based on inspecting the reflectance histogram, and stored once and for all with each model. Since the computation of this threshold can be performed at the time the model is added to the database, arbitrarily sophisticated methods could be used to compute it. As an extreme example, it could be set to provide optimum differentiation from other models in the database, based on synthetic renderings of numerous models.

6. Extreme specularities tend to be associated with points, such as areas in the eye, where the range data is unreliable. In addition, such points tend to saturate the intensity scale. Therefore it is preferable to impose a maximum threshold which intensity values must not exceed in order to be included in the lightsphere computation. Similarly, extremely dark areas of the query are strongly associated either with areas in cast shadow, or areas where reflectance computations mean little (such as hair). Both of these are sources of error for use, thus, a minimum threshold on intensity is also used in the query.

Those of skill in the art will appreciate that the methods of the present invention yield an identification of the object without the need for solving for light sources or other complex and costly computations such as eigenvector determination. Thus, the methods of the present invention result in the following advantages over prior art methods:

1. A primary advantage over prior art methods is an enormous savings in computational cost. This savings can make the difference between practicality and impracticality in a complete system. For example, the methods of the prior art which use mutual information, while more general and perhaps more effective in principle, are prohibitively expensive for an application requiring a large number of comparisons with models.

2. The methods of the present invention are simpler than the prior art methods. The methods of the present invention required mainly the single process of building a histogram-like data structure, which is little more than visiting each point of the model, extracting the pre-stored normal and reflectance, and performing a few arithmetic steps to update the histogram (while the data structure is referred to as a histogram, it is really a slight generalization). By comparison, other methods require iterative algorithms that take one to two orders of magnitude more computer time on the size of problems involved. For example, one prior art method involves use of the so-called Nonnegative Least Squares algorithm, which is a complex iterative algorithm. Similarly, other approaches of the prior art require computing so-called Principal Components. These computations require finding an eigenvector decomposition, and again require complex iterative algorithms. While these more complex algorithms are well-known and understood, they are nevertheless vastly more complex than the methods of the present invention.

3. The methods of the present invention are more robust than other methods. Methods of the prior art typically depend on finding the solution to a system of linear equations under constraints, or in solving for linear invariants such as eigenvectors. It is often hard to predict how the stability of these methods depends on the data and assumptions. Due to the straightforward nature of the methods of the present invention, unstable solutions are easily avoided.

4. The methods of the present invention are amenable to use in a system where partial solutions can be used. For example, in considering a large number of candidate models for identification, many models can be discarded as soon as the error is known to be sufficiently large. Using the methods of the present invention, it is possible to interrupt computation of the error or quality term at numerous stages, and resume it only if needed at later stages. In the methods of the prior art, it is difficult or impossible to do this without incurring the full cost of the most expensive part of the method.

5. The methods of the present invention are adaptable to unknown models of reflectance. Because light sources need not be computed, only the effect of lighting on the material being imaged is measured and assumed consistent. Even with specularities (shininess), the methods of the present invention allow for good results over a reasonable range of material properties.

6. The methods of the present invention are robust against errors in capturing reflectance, particularly if lighting effects are present in the captured reflectance data.

Since the methods of the present invention are extremely fast and do not require a great amount of computational effort, they may also be used in a system to winnow the candidate models that will be examined by more costly (and slower) methods by a factor of 10–100. These other methods are capable of a more precise identification, but are too costly for a very large database of candidate models.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for matching a two dimensional image to one of a plurality of three dimensional candidate models, the method comprising the steps of:

determining the position and orientation of the two dimensional image;

for each three dimensional candidate model, computing a histogram-like table having a computed brightness coefficient for each surface normal of the three dimensional candidate model based on the corresponding value in the two dimensional image, each brightness coefficient depending only on the corresponding surface normal;

successively rendering each three dimensional candidate model in the determined position and orientation using the surface normals in conjunction with the corresponding computed brightness histogram-like table; and comparing the two dimensional image with each of the rendered three dimensional candidate models.

2. The method of claim 1, further comprising the steps of determining if the two dimensional image matches one of the plurality of three dimensional models if the comparison between the two dimensional image and the rendered three dimensional model is within a predetermined allowable error.

3. The method of claim 1, wherein the comparison step results in a ranking for each of the rendered three dimensional models which indicates the likelihood that the corresponding three dimensional model matches the two dimensional image.

4. The method of claim 3, further comprising the step of choosing the three dimensional model corresponding to the rendered three dimensional model having the highest ranking as the three dimensional model which matches the two dimensional image.

5. The method of claim 1, further comprising the step of reading the three dimensional models from a database containing the plurality of three dimensional models.

6. The method of claim 1, wherein the comparing step is done simultaneously with the rendering step for each rendered three dimensional model.

7. The method of claim 1, wherein the computing step sets a minimum threshold of reflectance to be used in the computation of the histogram-like table.

8. The method of claim 1, wherein the computing step sets a minimum and/or maximum threshold of intensity to be used in the computation of the histogram-like table.

9. The method of claim 1, wherein the two dimensional image is a color image and wherein the a brightness coefficient is computed for each color component of the color image.

10. The method of claim 1, further comprising the step of smoothing the lightsphere histogram-like table to improve the rendering of each three dimensional model and the performance of the method.

11. The method of claim 10, wherein the smoothing step is done by a convolution with a small box function or other small smoothing kernel.

12. A method for matching a two dimensional image to one of a plurality of three dimensional candidate models, the method comprising the steps of:

determining the position and orientation of the two dimensional image;

for each three dimensional candidate model, computing a histogram-like table having a computed brightness coefficient for each surface normal of the three dimensional candidate model based on the corresponding value in the two dimensional image, a each brightness coefficient depending only on the corresponding surface normal;

computing the variance of the brightness coefficients that are used to create each bucket of the histogram-like table, a bucket being a set of similar normal values that are lumped together to form a single argument value in the histogram-like table;

computing the sum of the variances of the histogram-like table buckets; and ranking the three dimensional candidate models using its computed sum as an error function, the ranking indicating the likelihood that the corresponding three dimensional model matches the two dimensional image.

13. The method of claim 12, further comprising the step of choosing the three dimensional model corresponding to the three dimensional model having the highest ranking as the three dimensional model which matches the two dimensional image.

14. The method of claim 12, further comprising the step of reading the three dimensional models from a database containing the plurality of three dimensional models.

15. The method of claim 12, wherein the computing step sets a minimum threshold of reflectance to be used in the computation of the histogram-like table.

16. The method of claim 12, wherein the computing step sets a minimum and/or maximum threshold of intensity to be used in the computation of the histogram-like table.

17. The method of claim 12, wherein the two dimensional image is a color image and wherein the a brightness coefficient is computed for each color component of the color image.

18. The method of claim 12, wherein the sum of the variances are weighted by the number of samples in each bucket.

19. A method for matching a two dimensional image to one of a plurality of three dimensional candidate models, the method comprising the steps of:

determining the position and orientation of an object giving rise to the two dimensional image;

computing a representation of lighting effects that allows the lighting that gave rise to the two dimensional image to be used to render a realistic image of a three dimensional candidate model;

successively rendering each three dimensional candidate model in the determined position and orientation using the surface normals in conjunction with the corresponding computed representation of lighting effects; and comparing the two dimensional image with each of the rendered three dimensional candidate models.

20. A method for matching a two dimensional image to one of a plurality of three dimensional candidate models, the method comprising the steps of:

determining the position and orientation of an object giving rise to the two dimensional image;

computing a representation of lighting effects based on the plurality of three dimensional candidate models and the two dimensional image that allows evaluation of the likelihood that a particular three dimensional candidate model gave rise to a particular two dimensional image; and choosing the most likely three dimensional candidate model to have generated the query based on the computed representation of lighting effects.

21. A program storage device readable by machine, tangibly embodying a program of instructions executable by the machine to perform method steps for marching a two dimensional image to one of a plurality of three dimensional candidate models, the method comprising the steps of:

determining the position and orientation of the two dimensional image;

for each three dimensional candidate model, computing a histogram-like table having a computed brightness coefficient for each surface normal of the three dimensional candidate model based on the corresponding value in the two dimensional image, each brightness coefficient depending only on the corresponding surface normal;

successively rendering each three dimensional candidate model in the determined position and orientation using the surface normals in conjunction with the corresponding computed brightness histogram-like table; and comparing the two dimensional image with each of the rendered three dimensional candidate models.

22. A program storage device readable by machine, tangibly embodying a program of instructions executable by the machine to perform method steps for matching a two dimensional image to one of a plurality of three dimensional candidate models, the method comprising the steps of:

determining the position and orientation of the two dimensional image;

for each three dimensional candidate model, computing a histogram-like table having a computed brightness coefficient for each surface normal of the three dimensional candidate model based on the corresponding value in the two dimensional image, each brightness coefficient depending only on the corresponding surface normal;

competing the variance of the brightness coefficients that are used to create each bucket of the histogram-like table, a bucket being a set of similar normal values that are lumped together to form a single argument value in the histogram-like table;

computing the sum of the variances of the histogram-like table buckets; and ranking the three dimensional models using its computed sum as an error function, the ranking indicating the likelihood that the corresponding three dimensional candidate model matches the two dimensional image.

23. A program storage device readable by machine, tangibly embodying a program of instructions executable by the machine to perform method steps for matching a two dimensional image to one of a plurality of three dimensional candidate models, the method comprising the steps of:

determining the position and orientation of an object giving rise to the two dimensional image;

computing a representation of lighting effects that allows the lighting that gave rise to the two dimensional image to be used to render a realistic image of a three dimensional candidate model;

successively rendering each three dimensional candidate model in the determined position and orientation using the surface normals in conjunction with the corresponding computed representation of lighting effects; and comparing the two dimensional image with each of the rendered three dimensional candidate models.

24. A program storage device readable by machine, tangibly embodying a program of instructions executable by the machine to perform method steps for matching a two dimensional image to one of a plurality of three dimensional candidate models, the method comprising the steps of:

determining the position and orientation of an object giving rise to the two dimensional image;

computer readable program code means for computing a representation of lighting effects based on the plurality of three dimensional candidate models and the two dimensional image that allows evaluation of the likelihood that a particular three dimensional candidate model gave rise to a particular two dimensional image; and computer readable program code means for choosing the most likely three dimensional candidate model to have generated the query based on the computed representation of lighting effects.

* * * * *